(12) United States Patent
Zurecki et al.

(10) Patent No.: US 7,290,397 B2
(45) Date of Patent: Nov. 6, 2007

(54) LINEARLY-ACTUATED CRYO-FLUID CONNECTION (LACC) FOR MANUFACTURING MACHINES

(75) Inventors: Zbigniew Zurecki, Macungie, PA (US); Robert Bruce Swan, Bath, PA (US); Robert Ellsworth Knorr, Jr., Allentown, PA (US); William T. Zaboy, New Tripoli, PA (US)

(73) Assignee: Air Products & Chemicals, Inc., Allentown, PA (US)

( * ) Notice: Subject to any disclaimer, the term of this patent is extended or adjusted under 35 U.S.C. 154(b) by 486 days.

(21) Appl. No.: 10/492,741

(22) PCT Filed: Oct. 10, 2002

(86) PCT No.: PCT/US02/32482

§ 371 (c)(1), (2), (4) Date: Jun. 30, 2004

(87) PCT Pub. No.: WO03/035322

PCT Pub. Date: May 1, 2003

(65) Prior Publication Data

US 2004/0237542 A1    Dec. 2, 2004

(51) Int. Cl.
*F17C 13/00* (2006.01)

(52) U.S. Cl. .............................. 62/50.7; 285/39; 285/41

(58) Field of Classification Search ................. 62/50.7; 285/39, 41
See application file for complete search history.

(56) References Cited

U.S. PATENT DOCUMENTS

| 4,865,331 | A | 9/1989 | Porter |
| 5,265,505 | A | 11/1993 | Frechette |
| 5,529,284 | A | 6/1996 | Berger et al. |
| 5,568,929 | A | 10/1996 | Yoshinaga |
| 5,620,187 | A | 4/1997 | Jia |
| 5,628,517 | A | 5/1997 | Jia |
| 5,762,381 | A | 6/1998 | Vogel et al. |
| 5,853,198 | A | 12/1998 | Richied et al. |

(Continued)

FOREIGN PATENT DOCUMENTS

DE           3310034 A1     9/1984

(Continued)

OTHER PUBLICATIONS

International Search Report for PCT/US02/32482 mailed Jan. 17, 2003.

(Continued)

*Primary Examiner*—Frantz Jules
*Assistant Examiner*—John Pettitt
(74) *Attorney, Agent, or Firm*—Caesar, Rivise, Bernstein, Cohen & Pokotilow, Ltd.

(57) ABSTRACT

An automatically actuated line connection and delivery system is disclosed for the delivery of a cryogenic fluid coolant to tools mounted on manufacturing machines such as vertical and horizontal machining centers, punching presses, thermal spray systems, welding systems, laser cutters, etc. The system includes a linearly-actuated, cryogenic fluid socket/plunger connection "(20)" with a differential, thermal contraction-controlled sealing mechanism, "(22,24)" as well as provisions for installing this connection on automated manufacturing machines "(60,84)" and integrating operation of the connection "(20)" with the manufacturing cycle controlled from a remote control panel "(70)".

20 Claims, 9 Drawing Sheets

U.S. PATENT DOCUMENTS 5,862,833 A    1/1999  Perez
6,145,322 A   11/2000  Odashima
6,179,692 B1   1/2001  Hara

FOREIGN PATENT DOCUMENTS

| | | | |
|---|---|---|---|
| EP | 0961073 | A2 | 12/1999 |
| EP | 0961073 | B1 | 11/2003 |
| SU | 1400855 | A1 | 6/1988 |
| WO | 9708486 | A1 | 3/1997 |
| WO | WO 9960079 | A2 | 11/1999 |

OTHER PUBLICATIONS

U.S. Appl. No. 10/052,941, filed Oct. 22, 2001, Zurecki et al.

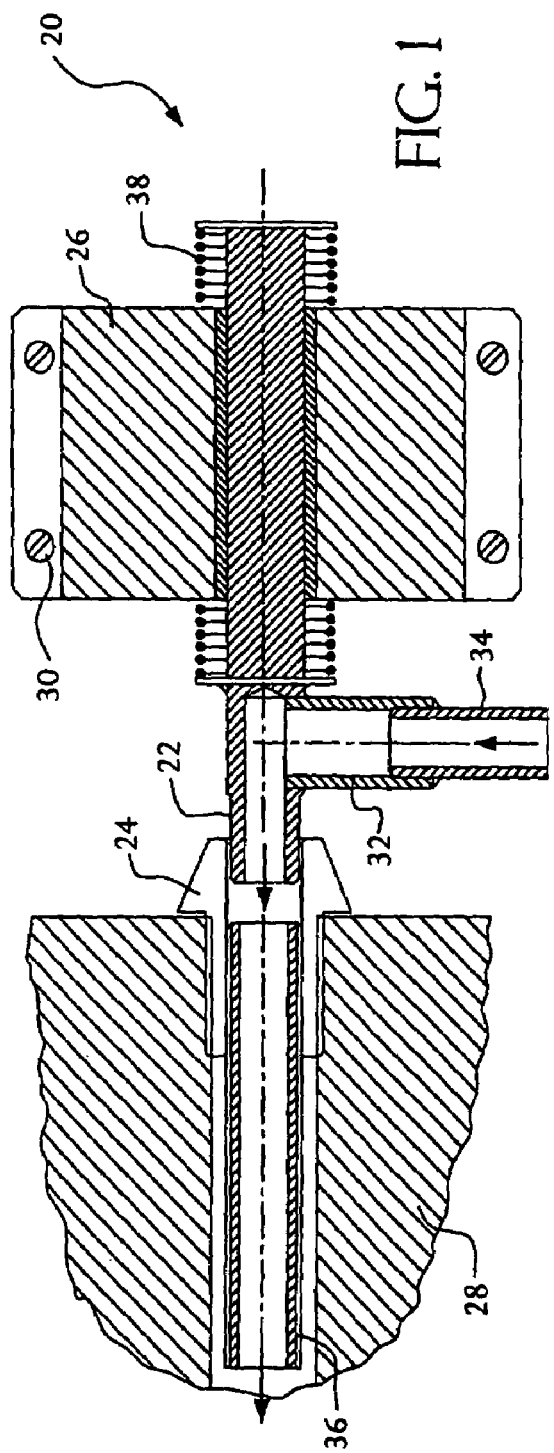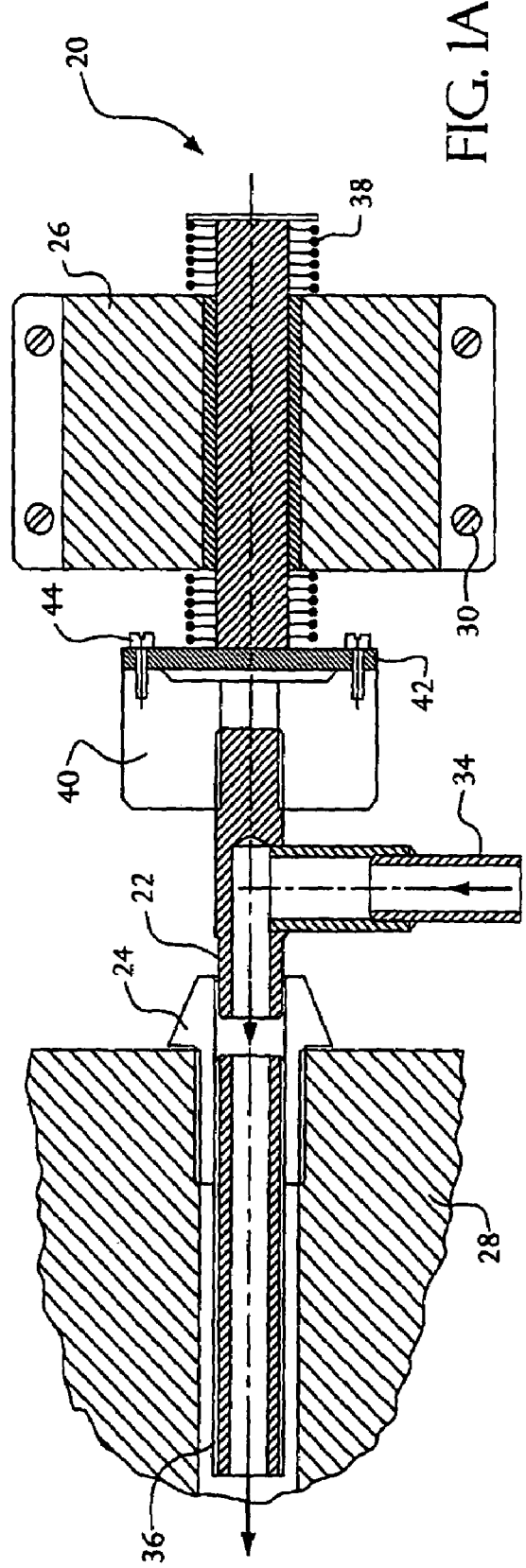

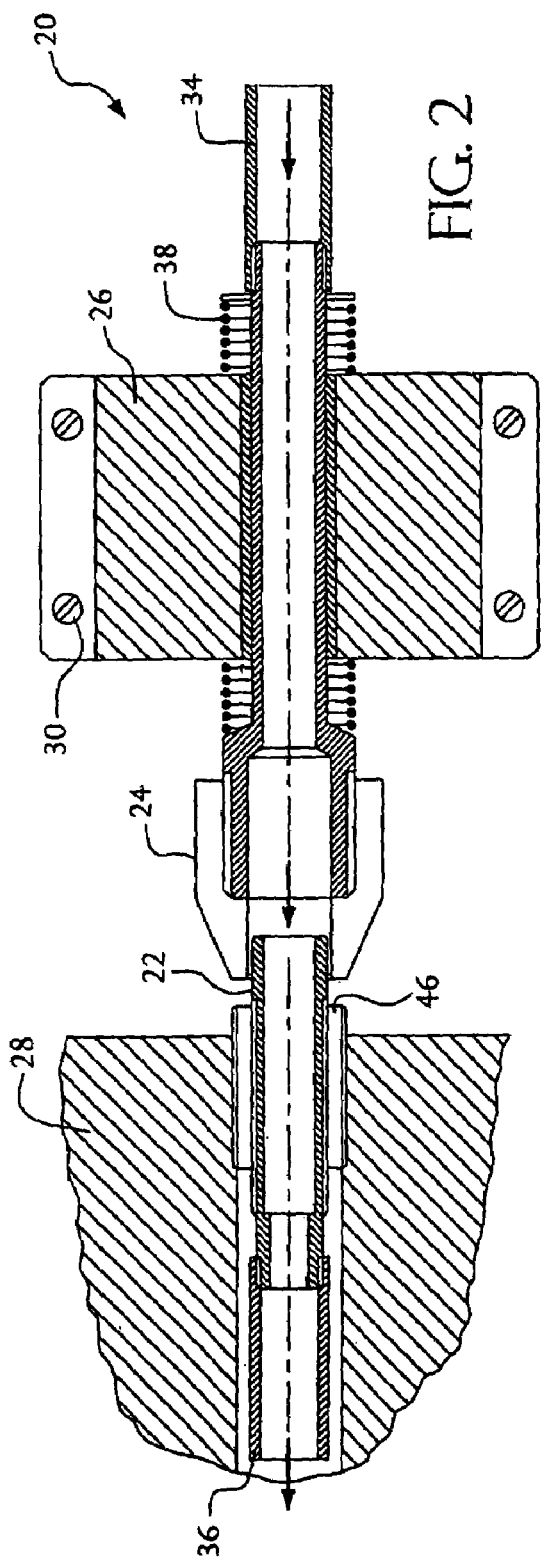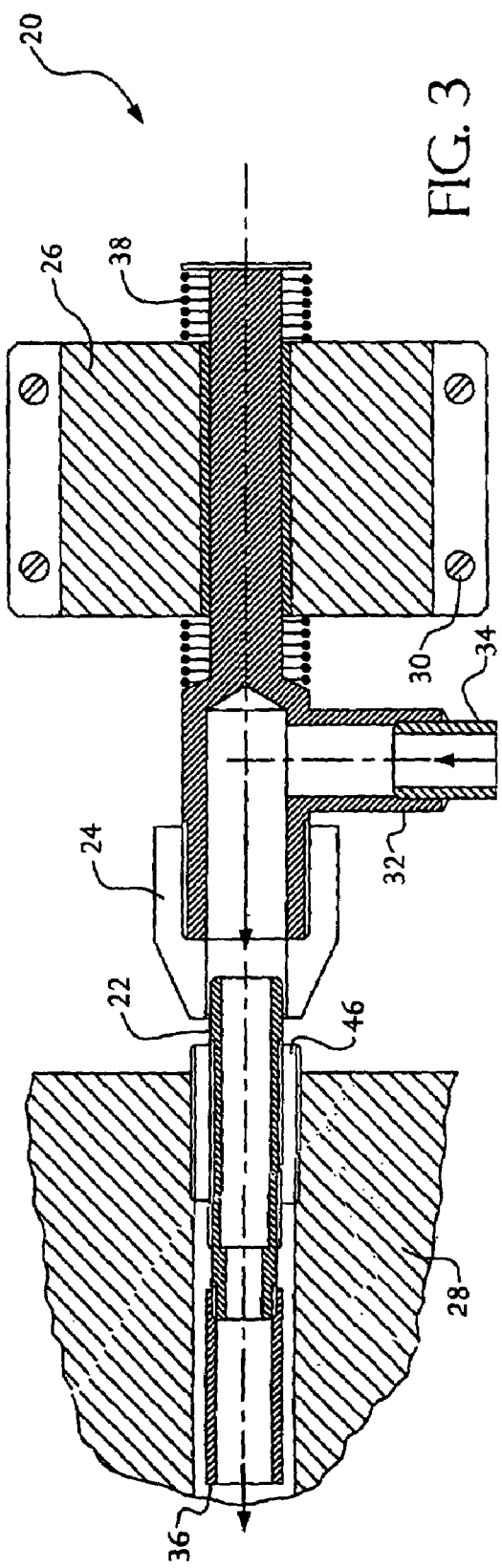

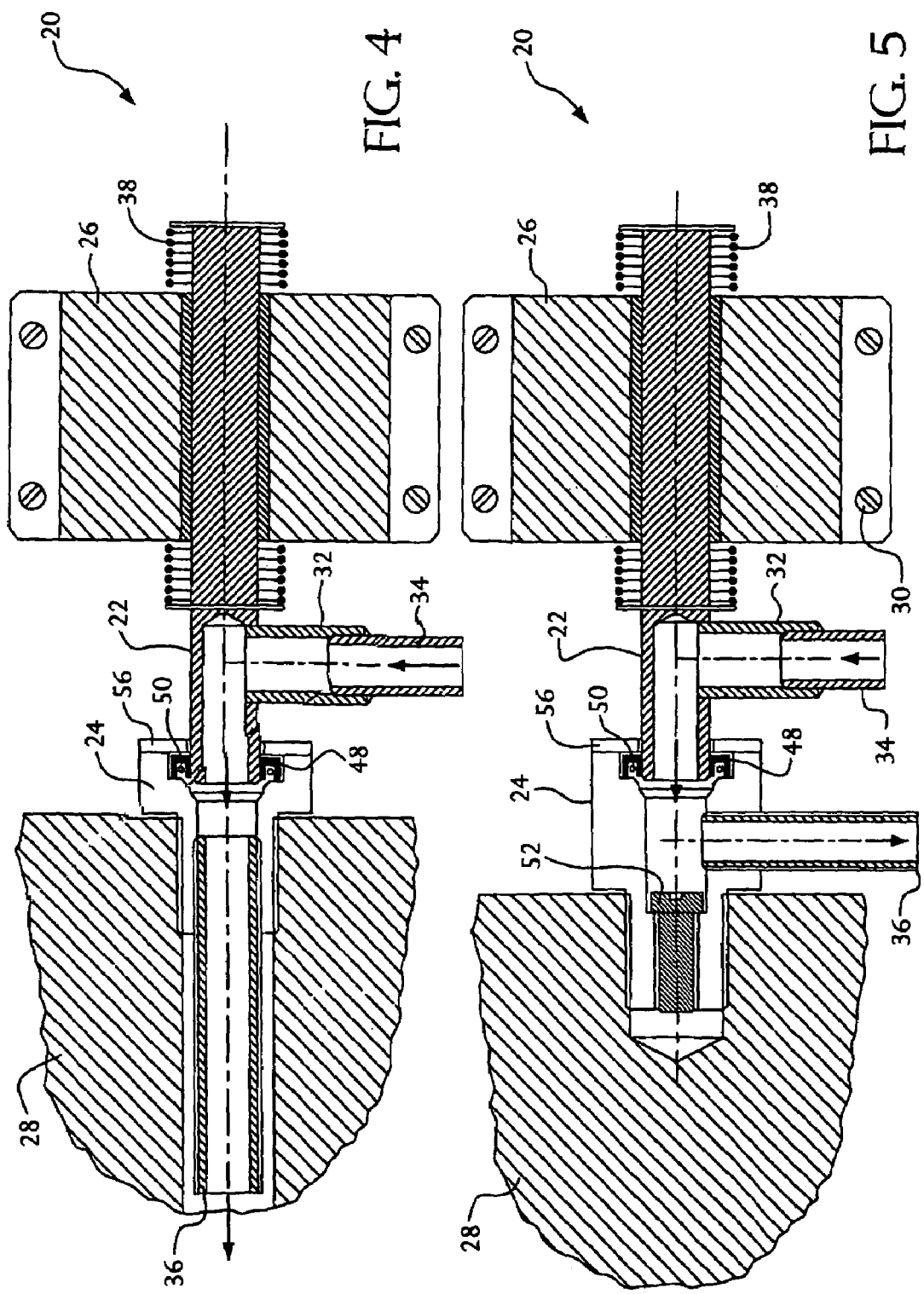

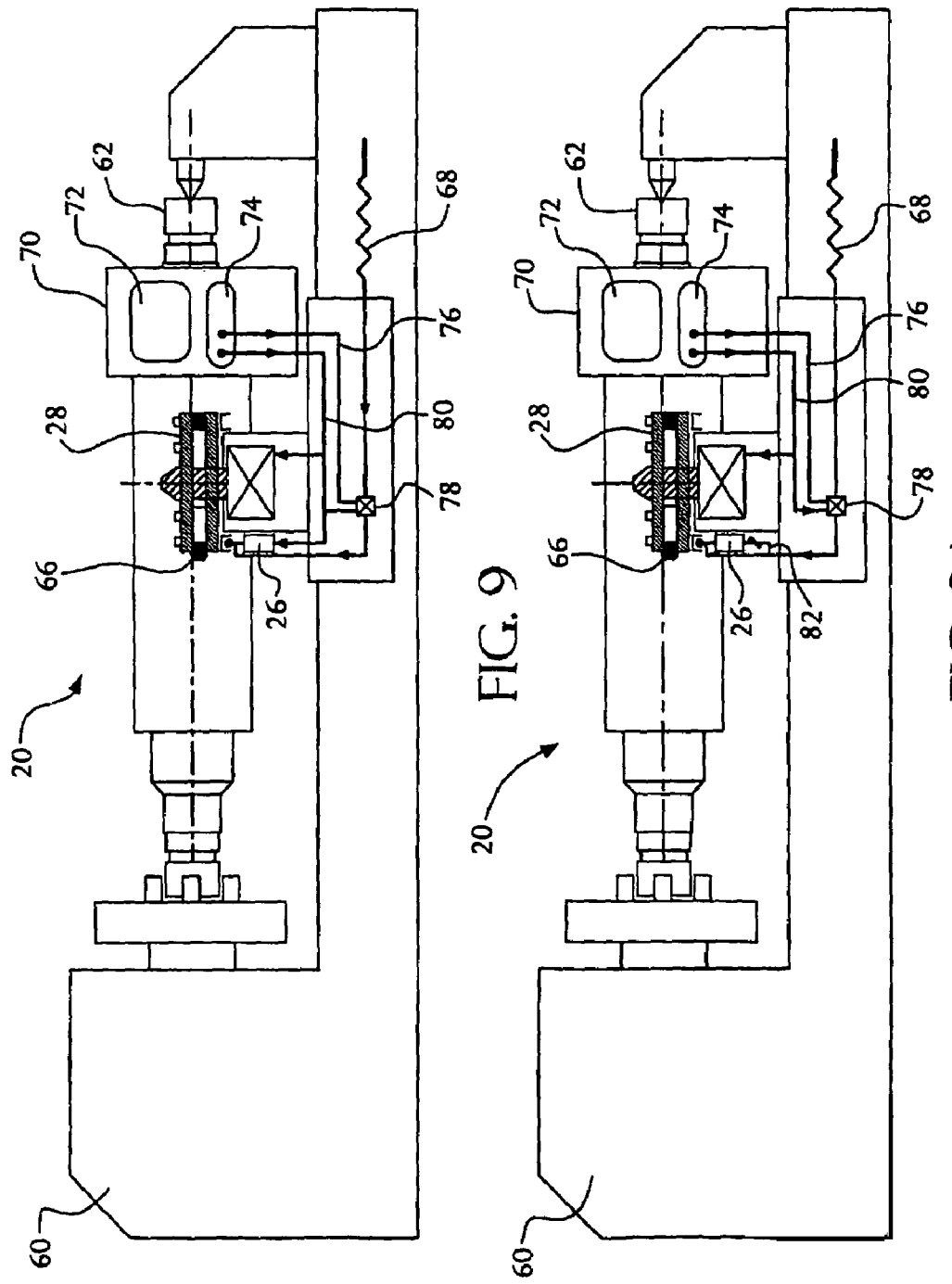

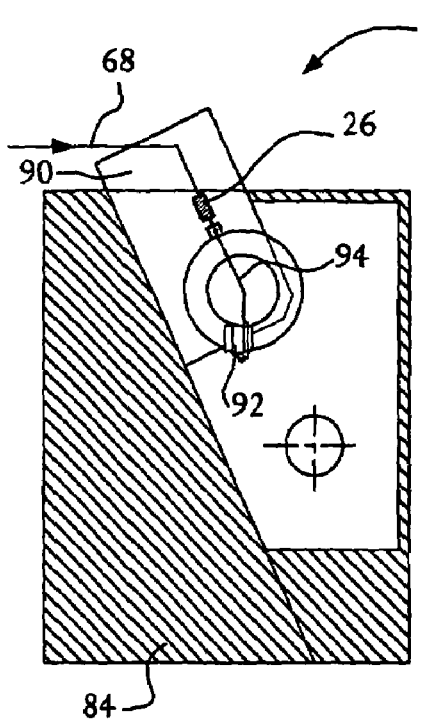 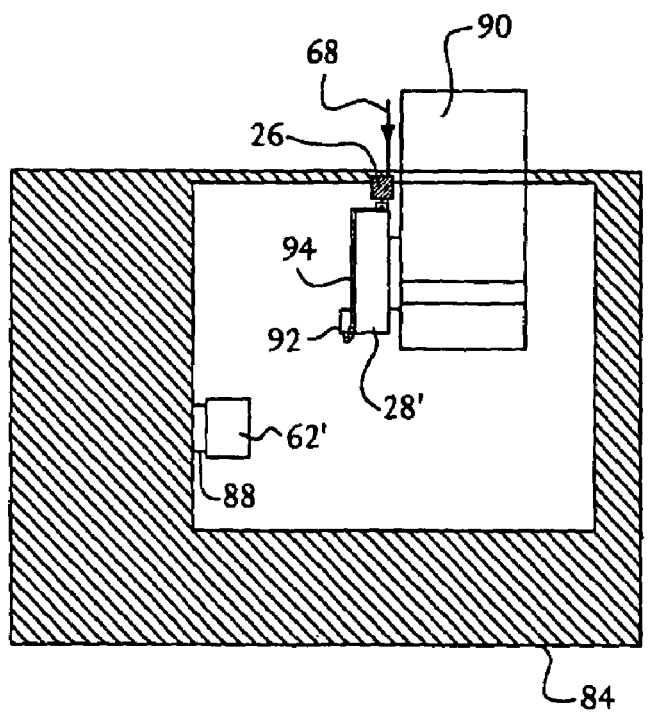
FIG. 12A    FIG. 12B
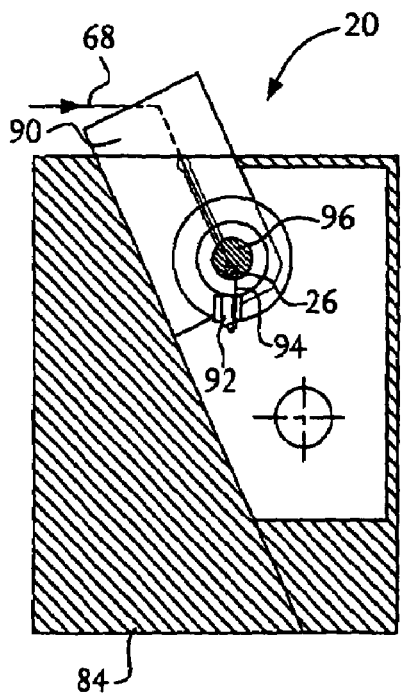 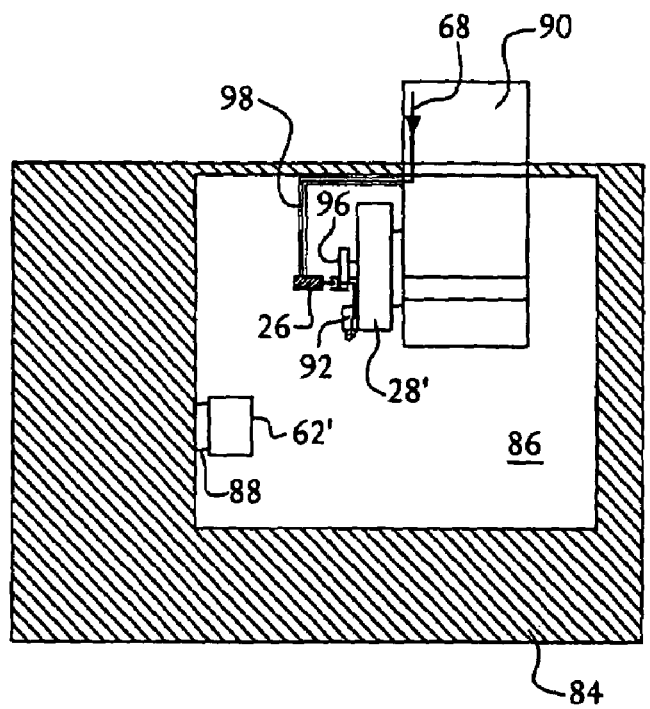
FIG. 13A    FIG. 13B

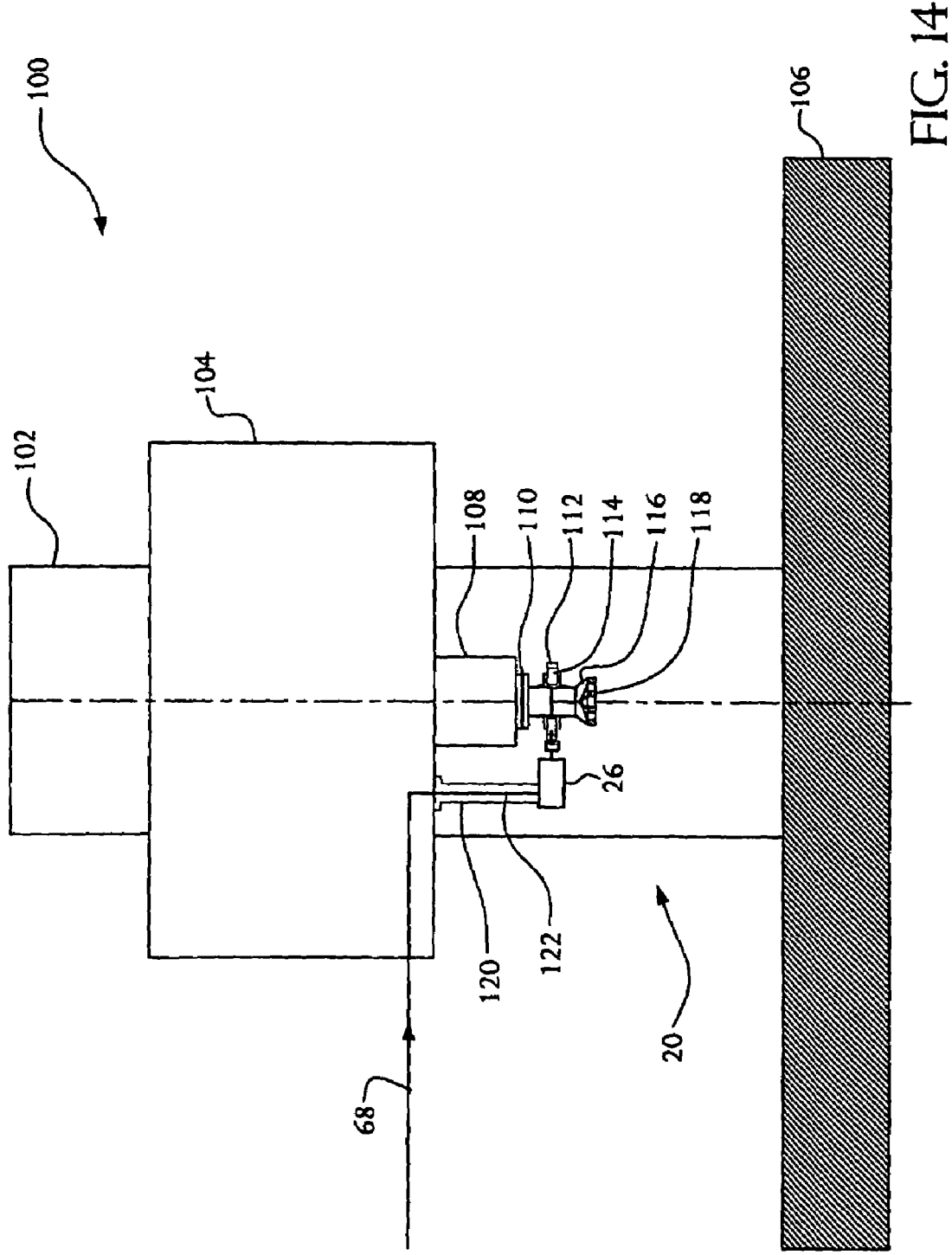

US 7,290,397 B2

LINEARLY-ACTUATED CRYO-FLUID CONNECTION (LACC) FOR MANUFACTURING MACHINES

BACKGROUND OF THE INVENTION

The present invention relates to machine tool cooling and to systems for supplying coolants to tools for cutting and other operations of manufacturing machines, and more particularly to systems and methods for connecting or disconnecting a supply of a cryogenic fluid to or from a cryogenic cooling means mounted on a machine component, such as a turret.

As used herein, the term "manufacturing machine" includes but is not limited to: machine tools—vertical and horizontal turret lathes with vertical and horizontal turret plates, vertical and horizontal milling machines with automatic tool change-over systems, and derivatives thereof; single or multi-wheel grinding machines, single or multi-spindle drilling machines, and similar vertical machining centers; and other machines with automatic tool changers—punching presses, thermal spray systems, welding systems, laser cutting, welding, and surfacing systems, etc.

Prompted by environmental, productivity, and cost-reduction pressures, the manufacturing industry continues to look for improved tool cooling methods and systems. Research and development work during the last decade has shown that the use of inert, compressed cryogenic fluids as coolants may result in certain benefits if a delivery system for such coolants and a fluid-flow line connection system are fully integrated with existing machine tools and the associated moving components that hold tools. Therefore, there is a need in the manufacturing industry for such a connection system.

Conventional coolant connection systems have been used for many years, and there are various types of cryogenic connectors or couplings. However, there does not exist a fully functional cryo-fluid coolant connection system for modern manufacturing machines, especially machines that are controlled by a computerized numerical controller (CNC).

Examples of coolant delivery systems for tools mounted on turret lathes are disclosed in U.S. Pat. No. 6,179,692 (Hara), U.S. Pat. No 5,265,505 (Frechette), and U.S. Pat. No 5,862,833 (Perez). However, the way that the conventional coolant passages are routed through turret plates and turret carriages in these patents, as well as the way that disconnectable passages are sealed, would be unacceptable in the case of cryogenic fluid coolants for the following reasons: (1) turret plates would thermally shrink, thereby affecting the dimensional accuracy of parts produced, (2) turrets and supporting machine components would frost during operation, leading to corrosion, (3) connections would either leak or seize, resulting in system malfunction or failure, and (4) the period of time required to cooldown the passages from ambient temperature (e.g., room temperature) to the temperature of the cryogenic fluid would be unacceptably long in view of the time allocated to particular machining operations.

Examples of different types of quick-releasing cryogenic couplings are disclosed in WO9708486 (Jepp) and U.S. Pat. No. 6,145,322 (Odashima) and U.S. Pat. No 5,762,381 (Vogel). However, as discussed below, these cryogenic couplings cannot be used in machine tool applications without having significant problems, difficulties, and disadvantages, both technical and economic.

The design of coaxial and vacuum insulated connecting pipes and the way of sealing the pipes with a screw motion, as disclosed by Jepp, excludes the use of this system for machine tools due to connection time that would be unacceptably long, space and cost limitations, as well as the complexity of an automatic actuator that would be required.

The design of Odashima provides for an automatic plugging of line exits in the disconnected condition by two self-opposing check valves and an opening of the coupling passage by squeezing these components against each other. The face seal assembly and the check valves require that certain axial forces are applied to engage the coupling. The design comprises a number of intricate and wearing (or consumable) parts wetted by cryogenic fluid, and the overall surface area and weight of these parts would result in the cooldown time from room temperature to the temperature of the cryogenic fluid being unacceptably long in view of the time allocated to particular machining operations. In effect, this type of coupling cannot be used for an actuated connection required in the case of machine tools.

The design of Vogel also cannot be used for such an automated connection since its sealing action requires (1) axial sealing of the two ends of the line, and (2) radial quick-connect clamping, necessitating an actuating device much more complex and expensive than a simple linear actuator which would be cost-justified in machine-tool retrofit systems.

It is desired to have an apparatus and a method for connecting or disconnecting a supply of a cryogenic fluid to or from a cryogenic cooling means mounted on a moveable machine component (e.g., a turret) and spaced apart from the supply of the cryogenic fluid which overcome the difficulties and disadvantages of the prior art to provide better and more advantageous results.

BRIEF SUMMARY OF THE INVENTION

Applicants' invention is an apparatus and a method for connecting or disconnecting a supply of a cryogenic fluid to or from a cryogenic cooling means mounted on a member and spaced apart from the supply of the cryogenic fluid. Another aspect of the invention is a machine including at least one such apparatus.

A first embodiment of the apparatus includes a plunger, a socket, and an actuating means. The plunger is made at least in part of a first material having a first coefficient of thermal expansion. The plunger has an inlet in fluid communication with the supply of the cryogenic fluid, an outlet in fluid communication with the inlet, and an outer periphery. The socket is made at least in part of a second material having a second coefficient of thermal expansion. The socket has a first port in fluid communication with the cryogenic cooling means, and a second port in fluid communication with the first port and having an inner periphery adapted to received the outer periphery of the plunger. The inner periphery and the outer periphery are substantially similar in geometric shape. The actuating means is for inserting or withdrawing the outlet of the plunger into or out of the second port of the socket, wherein a difference between the first coefficient of thermal expansion and the second coefficient of thermal expansion enhances a seal between the outer periphery of the plunger and the inner periphery of the second port.

There are several variations of the first embodiment of the apparatus. In one variation, a leading portion of a stream of the cryogenic fluid is vented from the socket to a surrounding atmosphere before the seal becomes fluid tight. In another variation, the seal is further enhanced when a stream of the cryogenic fluid flows through the outlet.

In another variation of the first embodiment of the apparatus, the first coefficient of thermal expansion is less than the second coefficient of thermal expansion. In another variation, the first material is metallic. In yet another variation, the second material is polymeric.

There are still yet other variations of the first embodiment of the apparatus. In one variation, the actuating means moves the plunger toward the socket. In another variation, the actuating means moves the socket toward the plunger. In yet another variation, the actuating means is energized at least in part by a portion of the cryogenic fluid.

In another variation of the first embodiment of the apparatus, the member is movable. In a variant of this variation, the movable member is a machine component. In a variation of that variant, the movable machine component is a turret.

In another variation of the first embodiment of the apparatus, the actuating means is automated and adapted to automatically insert or withdraw the outlet of the plunger into or out of the second port of the socket. In a variant of this variation, the actuating means is activated by a computerized numerical controller.

Another embodiment is an apparatus for connecting a supply of a cryogenic fluid to a cryogenic cooling means mounted on a movable machine component and spaced apart from the supply of the cryogenic fluid. This embodiment includes a plunger, a socket, and an automated actuating means. The plunger is made at least in part of a metal having a first coefficient of thermal expansion. The plunger has an inlet in fluid communication with the supply of the cryogenic fluid, an outlet in fluid communication with the inlet, and an outer periphery. The socket is made at least in part of a polymer having a second coefficient of thermal expansion greater than the first coefficient of thermal expansion. The socket has a first port in fluid communication with the cryogenic cooling means, and a second port in fluid communication with the first port and having an inner periphery adapted to receive the outer periphery of the plunger. The inner periphery and the outer periphery are substantially similar in geometric shape. The automated actuating means is for inserting automatically the outlet of the plunger into the second port of the socket, wherein a difference between the first coefficient of thermal expansion and the second coefficient of thermal expansion enhances a seal between the outer periphery of the plunger and the inner periphery of the second port, and wherein a leading portion of a stream of the cryogenic fluid flowing from the plunger is vented from the socket to the surrounding atmosphere before the seal becomes fluid tight.

Another aspect of the invention is a machine including at least one apparatus as in any of the embodiments of the apparatus or any variations of those embodiments of the apparatus.

A first embodiment of the method for connecting a supply of a cryogenic fluid to a cryogenic cooling means mounted on a member and spaced apart from the supply of the cryogenic fluid includes multiple steps. The first step is to provide a plunger made at least in part of a first material having a first coefficient of thermal expansion, the plunger having an inlet in fluid communication with the supply of the cryogenic fluid, an outlet in fluid communication with the inlet, and an outer periphery. The second step is to provide a socket made at least in part of a second material having a second coefficient of thermal expansion, the socket having a first port in fluid communication with the cooling means, and a second port in fluid communication with the first port and having an inner periphery adapted to receive the outer periphery of the plunger. The inner periphery and the outer periphery being substantially similar in geometric shape. The third step is to provide an actuating means for inserting the outlet of the plunger into the second port of the socket, wherein a difference between the first coefficient of thermal expansion and the second coefficient of thermal expansion enhances a seal between the outer periphery of the plunger and the inner periphery of the second port. The fourth step is to energize the actuating means, thereby inserting the outlet of the plunger into the second port of the socket.

A second embodiment of the method is similar to the first embodiment but includes an additional step, which is to flow a stream of the cryogenic fluid into the inlet and through the outlet of the plunger, thereby further enhancing the seal.

A third embodiment of the method is similar to the first embodiment but includes an additional step of venting a portion of the cryogenic fluid from the socket to a surrounding atmosphere before the seal becomes fluid tight.

Another embodiment is a method for connecting a supply of a cryogenic fluid to a cryogenic cooling means mounted on a movable machine component and spaced apart from the supply of the cryogenic fluid, which method includes multiple steps. The first step is to provide a plunger made at least in part of a metal having a first coefficient of thermal expansion, the plunger having an inlet in fluid communication with the supply of the cryogenic fluid, an outlet in fluid communication with the inlet, and an outer periphery. The second step is to provide a socket made at least in part of a polymer having a second coefficient of thermal expansion greater than the first coefficient of thermal expansion, the socket having a first port in fluid communication with the cryogenic cooling means, and a second port in fluid communication with the first port and having an inner periphery adapted to receive the outer periphery of the plunger, the inner periphery and the outer periphery being substantially similar in geometric shape. The third step is to provide an automated actuating means for inserting automatically the outlet of the plunger into the second port of the socket, wherein a difference between the first coefficient of thermal expansion and the second coefficient of thermal expansion enhances a seal between the outer periphery of the plunger and the inner periphery of the second port. The fourth step is to energize the actuating means, thereby inserting the outlet of the plunger into the second port of the socket, wherein a leading portion of a stream of the cryogenic fluid flowing from the plunger is vented from the socket to a surrounding atmosphere before the seal becomes fluid tight. The fifth step is to flow a stream of the cryogenic fluid into the inlet and through the outlet of the plunger, thereby further enhancing the seal.

BRIEF DESCRIPTION OF THE DRAWINGS

The invention will be described by way of example with reference to the accompanying drawings, in which:

FIG. 1 is a schematic diagram of an embodiment of the invention;

FIG. 1A is a schematic diagram of another embodiment of the invention;

FIG. 2 is a schematic diagram of another embodiment of the invention;

FIG. 3 is a schematic diagram of another embodiment of the invention;

FIG. 4 is a schematic diagram of another embodiment of the invention;

FIG. 5 is a schematic diagram of another embodiment of the invention;

FIG. 9 is a schematic diagram of an embodiment of the invention installed on a horizontal turret lathe having an electrically energized actuator;

FIG. 9A is a schematic diagram of an embodiment of the invention installed on a horizontal turret lathe having a cryo-fluid energized actuator;

FIGS. 12A and 12B are schematic diagrams of a front view and a side view illustrating a "radial-plunger" configuration of a embodiment of the invention installed on a slant-bed lathe with a vertical turret plate having a cryo-fluid line routed over the surface of the turret plate;

FIGS. 13A and 13B are schematic diagrams of a front view and a side view illustrating a "front-plunger" configuration of an embodiment of the invention installed on a slant-bed lathe with a vertical turret plate having a cryo-fluid line routed over a front adapter plate and the surface of the turret plate; and FIG. 14 is a schematic diagram of an embodiment of the invention installed on a milling machine having a socket/plunger coupling in a rotational ring-coupling mounted on an automatically changed milling cutter.

DETAILED DESCRIPTION OF THE INVENTION

Figure 6:
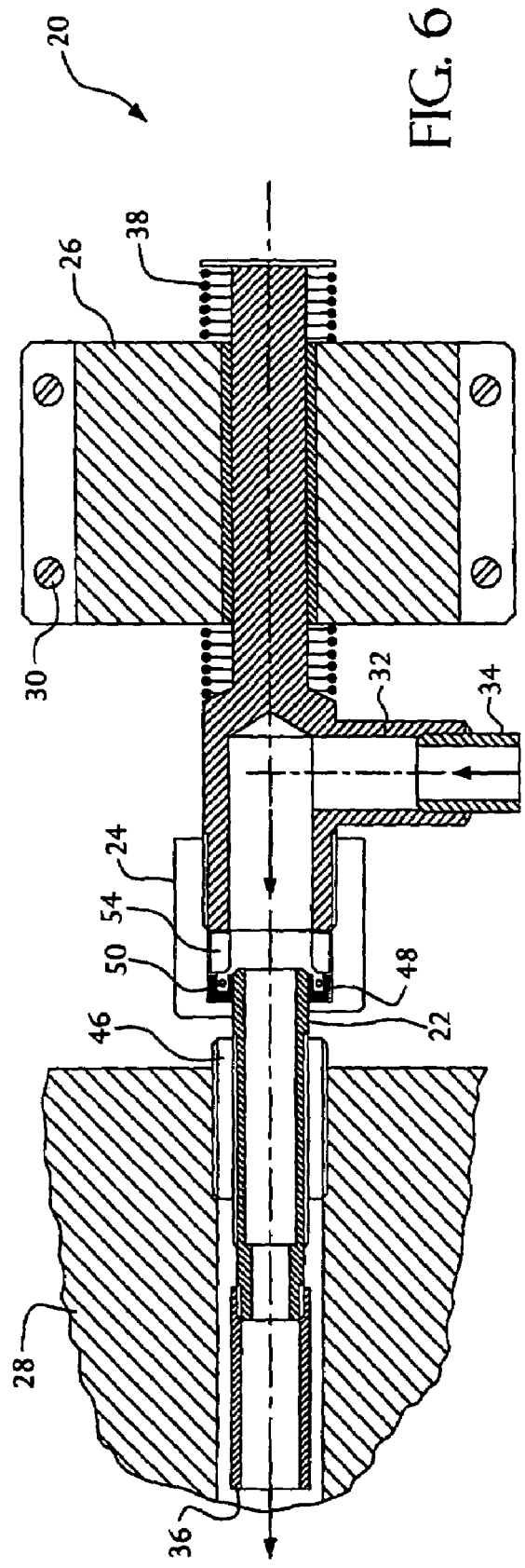
FIG. 6 is a schematic diagram of another embodiment of the invention.

The present invention is a linearly-actuated socket/plunger connection having a special sealing mechanism for use with cryogenic fluids, and includes a system for installing this type of connection on manufacturing machines. The invention also is a method for connecting a supply of a cryogenic fluid to a cryogenic cooling means to provide an effective cooling of tools mounted on traversing and indexing machines engaged in manufacturing operations, e.g., cutting of work materials. In addition to pure cryogenic fluids, the invention may be used with coolants comprising mixtures of cryogens and other fluids (e.g., oils, etc.).

FIGS. 1-7 illustrate various embodiments of the invention. Each of these embodiments is discussed below.

FIG. 1 illustrates the basic components of the linearly-actuated socket/plunger connection 20—a metallic plunger 22 having a specific outer diameter (OD), a polymeric socket 24 having a specific inner diameter (ID), and a linear actuator 26. The socket is mounted (using a threaded connection or other connecting means) on a turret plate 28 or other indexable machine part that holds tools (not shown) and is mounted on a carriage (not shown). Alternatively, the socket may be mounted on a tool adapter (not shown) or tool holder (not shown) that is mounted on the turret plate. The actuator is mounted on the turret carriage by bolts 30 or other fasteners. The plunger, which is connected to the actuator, is moved by the actuator toward the socket and is inserted in the socket. A metallic T-connection 32 connects the plunger to inlet tubing 32 that transmits cryogenic fluid from a supply source (not shown) to the plunger. The flexible inlet tubing may be metallic (e.g., corrugated or bellows) or may be made of a fluorocarbon polymer (e.g., PTFE and its derivatives). The cryogenic fluid flows from the inlet tubing 34 to a rigid, metallic outlet tubing via the plunger/socket connection. The outlet tubing transmits the cryogenic fluid to a jetting nozzle (not shown) or other apparatus to cool a cutting tool or other tool (not shown). As the cryogenic fluid flows to and through the plunger/socket connection, a seal forms between the outer periphery of the plunger and the inner periphery of the socket. The manner in which this seal is formed is discussed below with regard to FIG. 8. The optional spring 38 (compression and/or expansion spring) shown in FIG. 1 may be used to assist the linear actuator in disconnecting the plunger from the socket.

The embodiment shown in FIG. 1A is similar to the embodiment shown in FIG. 1, but includes a thermally insulating adapter plate 40 connected to the plunger 22 by a threaded connection or other connecting means. The adapter plate, which preferably is made of a polymeric material (e.g., G10 Garolite epoxy composite available from www-.mcmaster.com), is connected to the actuator 26 by a counterface metallic plate 42 and bolts 44. The purpose of the adapter plate is to protect the actuator from cooling. The type of actuator that is used in this embodiment cannot be operated at low temperatures.

In the embodiment shown in FIG. 2, the linear actuator 26 moves the polymeric socket 24 to the metallic plunger 22. The metallic plunger is connected to the turret plate 28 (or other indexable machine part) by a mounting tube 46 made of a polymer. The type of actuator used in this embodiment is not sensitive to cooling or may require cryo-fluid flow for operation.

The embodiment shown in FIG. 3 is similar to the embodiment shown in FIG. 2, except for the connection of the inlet tubing 34 to the socket 24. Whereas the cryogenic fluid flows through the center of the rod of the actuator 26 in FIG. 2, the cryogenic fluid flows through a T-connection 32 extending directly from the rod of the actuator 26 in FIG. 3.

The embodiment shown in FIG. 4 is similar to the embodiment shown in FIG. 1, but includes some additional features. A polymeric holding plate 56 is attached to the socket 24 with cryo-epoxy or small set screws (not shown). The socket has a hollow radial seal 48, having a specific inner diameter, made of PTFE or its composites or derivatives. The replaceable radial seal 48 is encased in the socket. An optional internal spring 50 for OD and ID loading may be provided.

The embodiment shown in FIG. 5 is a modification of the embodiment shown in FIG. 4. This embodiment (FIG. 5) has a blind socket 24 and radial outlet tubing 36 bypassing the turret plate 28. A metallic mounting bolt 52 is used to mount the socket on the turret plate.

FIG. 6 is a modification of the embodiment shown in FIG. 4. This embodiment (FIG. 6) has a reverse orientation of the plunger 22 (which is stationary) mounted in the turret plate 28 and a socket-seal (moving axially) mounted on the rod of the actuator 26. This embodiment (FIG. 6) includes a one-piece socket 24 for holding a seal and a filler ring 54 with an ID sufficiently large to never interfere with the plunger OD and other provisions allowing a direct communication between the cryogenic fluid and the internal volume of the hollow radial seal 48.

Figure 7:
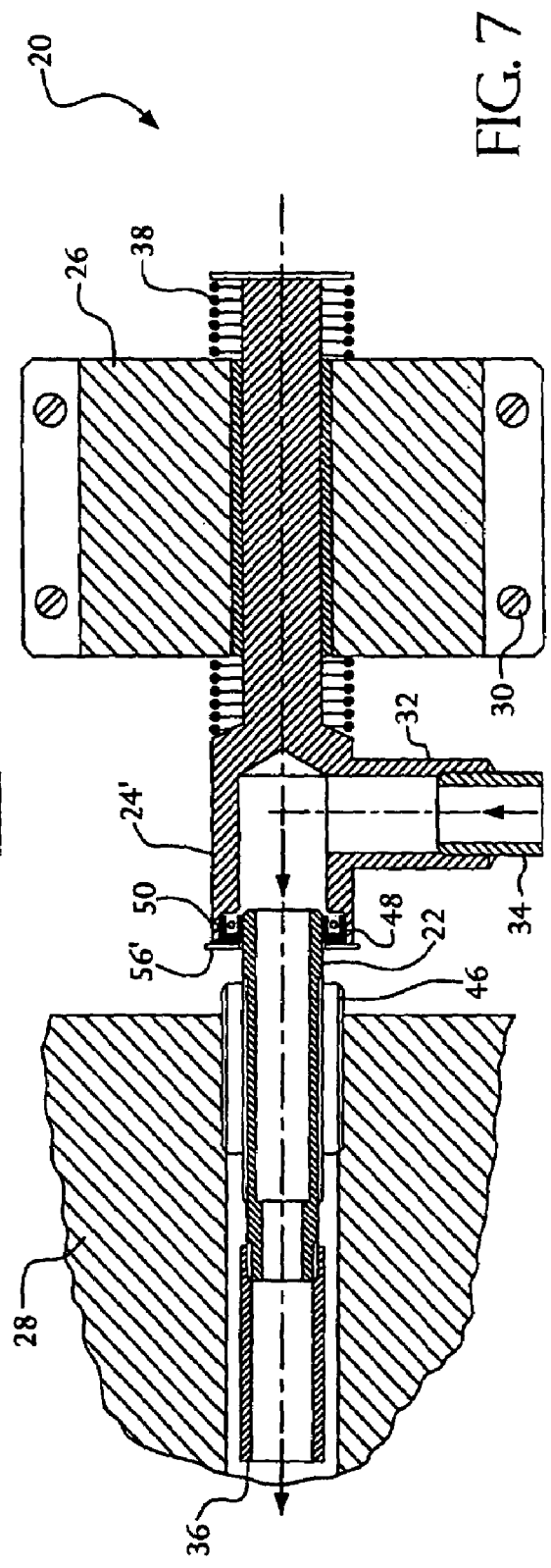
FIG. 7 is a schematic diagram of another embodiment of the invention.

The embodiment shown in FIG. 7 is another modification of the embodiment shown in FIG. 4. This embodiment (FIG.

7) has a hollow polymeric radial seal 48 mounted inside a metallic socket 24. The retaining or holding plate 56 also is metallic.

The embodiments shown in FIGS. 1-7 are included with other embodiments in the matrix of configurations in Table 1 below based on the design rules set forth below Table 1.

TABLE 1

Plunger/Socket Seal Configurations (40), Examples

| | plunger mounted on axially traversing actuator shaft | | | | socket/socket-seal mounted on axially traversing actuator shaft | | | |
|---|---|---|---|---|---|---|---|---|
| | Cryo-fluid inlet is axial with plunger and socket-seal | | Cryo-fluid inlet is perpendicular to the plunger/socket-seal axis | | Cryo-fluid inlet is axial with plunger and socket-seal | | Cryo-fluid inlet is perpendicular to the plunger/socket-seal axis | |
| | Cryo-fluid outlet is axial with plunger and socket-seal | Cryo-fluid outlet is radial with respect to the plunger and socket-seal axis | Cryo-fluid outlet is axial with plunger and socket-seal, FIG. 1 | Cryo-fluid outlet is radial with respect to the plunger and socket-seal axis | Cryo-fluid outlet is axial with plunger and socket-seal, FIG. 2 | Cryo-fluid outlet is radial with respect to the plunger and socket-seal axis | Cryo-fluid outlet is axial with plunger and socket-seal, FIG. 3 | Cryo-fluid outlet is radial with respect to the plunger and socket-seal axis |
| Socket-seal is a solid polymer part | | | | | | | | |
| Socket-seal is a hollow radial seal mounted in a polymer socket | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis |
| Socket-seal is a hollow radial seal mounted in a metallic socket mount | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis |
| Socket-seal is a hollow radial seal with an internal collspring loading, mounted in a polymer socket | Cryo-fluid outlet is axial with plunger and socket-seal | Cryo-fluid outlet is radial with respect to the plunger and socket-seal axis | Cryo-fluid outlet is axial with plunger and socket-seal, FIG. 4 | Cryo-fluid outlet is radial with respect to the plunger and socket-seal axis, FIG. 5 | Cryo-fluid outlet is axial with plunger and socket-seal | Cryo-fluid outlet is radial with respect to the plunger and socket-seal axis, | Cryo-fluid outlet is axial with plunger and socket-seal, FIG. 6 | Cryo-fluid outlet is radial with respect to the plunger and socket-seal axis |
| Socket-seal is a hollow radial seal with an Internal collspring loading, mounted in a metallic socket | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis | Cryo-fluid outlet is axial with plunger and socket-seal | Cryo-fluid outlet is radial with respect to the plunger and socket-seal axis | Cryo-fluid outlet is axial with plunger and socket-seal, FIG. 7 | Cryo-fluid outlet is radial with respect to the plunger and socket-seal axis |

The following design rules apply:

plunger is made of metal or a metal-like material, preferably, a 300-series or 400-series stainless steel, but a composite material also could be used.

socket or a socket-seal is made of polymer, preferably, a Teflon composite or an ultra-high molecular weight polyethylene plunger and socket/socket-seal should be accurately mounted on the same axis either plunger or socket/socket-seal can be mounted on axially traversing actuator shaft either plunger or socket/socket-seal can be mounted on the machine part which is stationary along the axis of the actuator cryo-fluid inlet can be positioned in the plunger/socket axis or perpendicularly to it using a "T"-inlet cryo-fluid outlet can be positioned in the plunger/socket axis or perpendicularly to it using radial outlet if a hollow radial socket-seal is used over the outer diameter of plunger, its hollow side opening is directed opposite to the cryo-fluid flow direction in order to utilize the pressure of the cyro-fluid for the further enhancement of sealing force if a hollow radial socket-seal is used over the outer diameter of plunger, Its hollow side opening can be radially expanded with a metallic spring, e.g., a coil spring, in order to improve the sealing effect on the outer diameter of the socket-seal Selection of a linearly-actuated cryo-fluid connection (LACC) configuration for a particular installation is dictated by the specific features of the manufacturing machine as well as the materials and components (e.g., an actuator) available at the time of fabricating the entire connection system. The preferred materials of construction are: 300-series stainless steel for the plunger; Teflon derivatives, Vespel, ultra-high molecular weight polyethylene, or similar polymers for the socket and/or the hollow socket-seal; and an epoxy composite such as Garolite G10 for the mounting and insulating components. Table 2 below lists the values of thermal contraction of these materials on quenching from room temperature (293K) to the temperature (80K) of liquid nitrogen boiling at 1 atmosphere pressure.

TABLE 2

Thermal Contraction of Materials of Construction on Immersion Quenching in Liquid Nitrogen (from 293 K to 80 K)

| Material | Comment | Thermal Contraction in Percent (%) |
| --- | --- | --- |
| 304 stainless steel | measured in the direction of rolling | 0.285 |
| 440 stainless steel | measured in the direction of rolling | 0.190 |
| Teflon PTFE-grade (plain) | anisotropic grade | 1.75 |
| Teflon reinforced with glass particles | McMaster-Carr supplier/distributor | 1.42 |
| Teflon-carbon composite | McMaster-Carr supplier/distributor, properties vary with carbon content | 1.10 |
| Vespel SP3 | McMaster-Carr supplier/distributor | 0.73 |
| Garolite: glass-fiber epoxy composite G10 | McMaster-Carr suppler/distributor: parallel to fibers perpendicular to fibers | 0.21 0.64 |

The contraction differences between the materials show that the conventional, room temperature-based methods of coupling individual LACC components would result in seizures or, on the other hand, a leakage of compressed cryo-fluid coolants during operation. A solution to this problem is shown in FIG. 8 and discussed below.

The initial room-temperature diameters of the socket and the plunger are selected in such a way that, after cooling both components to the temperature of the cryogenic fluid, the allowance between the outer diameter (OD) of the plunger and the inner diameter (ID) of the socket/socket-seal is zero or only slightly negative ("interference fit"). That gives a sufficiently tight radial fit between the two components, which is required for a leak-free operation. This also means that the initial room temperature allowance is positive ("slip fit"), i.e., there is a leakage gap between the socket/socket-seal and the plunger. Thus, as the LACC is coupled, and the cryogenic fluid flow is turned on at its remote source, the initial portion of the cryogenic fluid may leak out through the gap between the socket and the plunger, and the leak-tight seal is established only a short time later (e.g., a few seconds) when these two components become cool.

This self-regulating, dynamic sealing effect may at first appear wasteful with respect to the cryogenic fluid, but this effect is in fact highly desirable because it provides for a brief venting of the initial warm portion of the cryogenic fluid entering the lines and the LACC. The warm portion of the cryogenic fluid, which is heated in the process of cooling the up-stream line, tends to choke the entire flow in the LACC and the down-stream line, passages, and discharging nozzles aimed at manufacturing tools, thereby resulting in an unacceptably long start-up time. Thus, the brief venting of the warm portion of the cryogenic fluid during the cooldown accelerates the start-up of the entire system (i.e., delivery of cold cryogenic fluid to tools) and enables an effective, fast tool cooling operation within the constraints of a given manufacturing cycle. This feature of the LACC is counter-intuitive.

Figure 8:
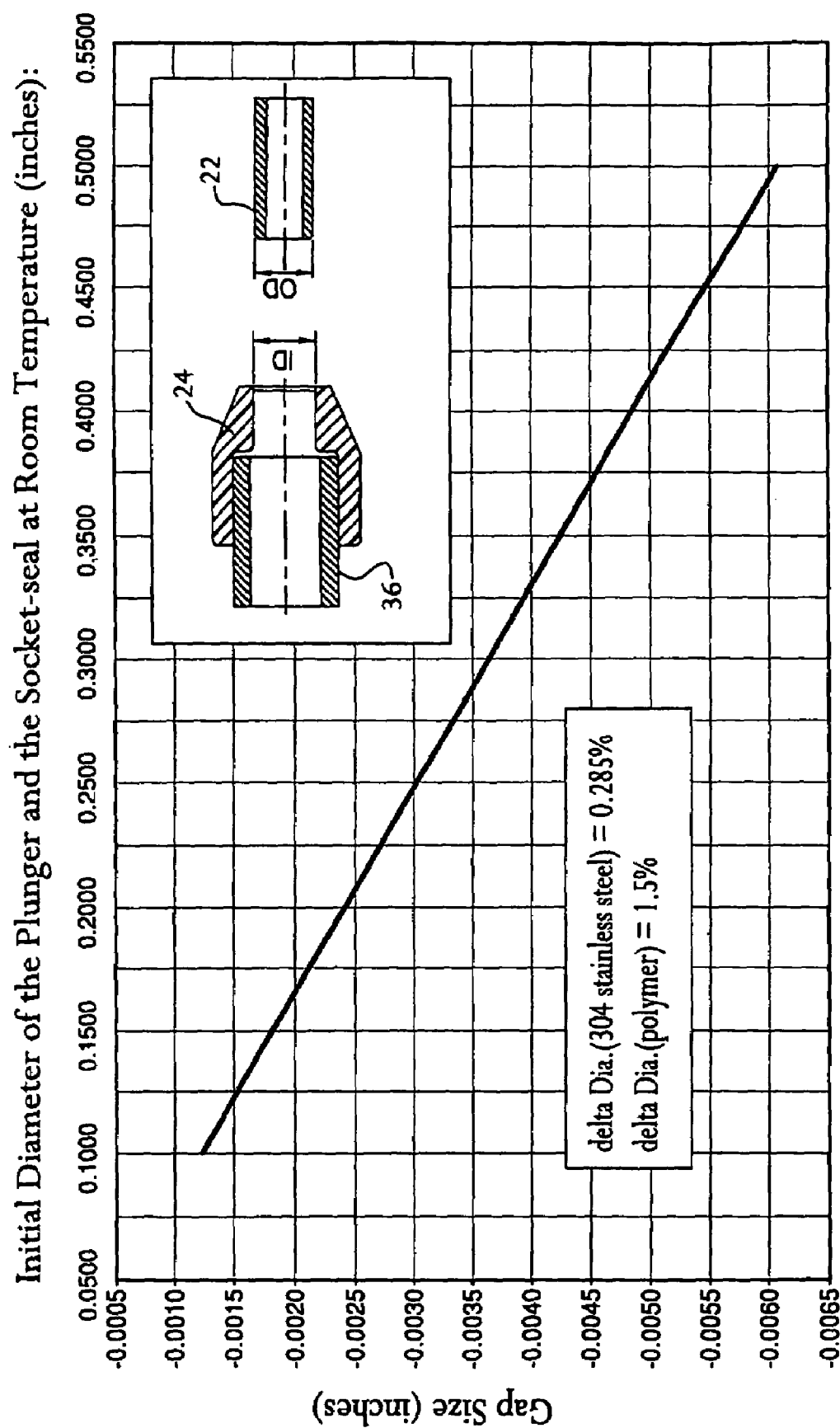
FIG. 8 is a graph showing the difference in the relative contraction between the outer diameter of a 304 stainless steel plunger and the inner diameter of a polymeric socket-seal after cooling from room temperature to the temperature of liquid nitrogen.

The line plotted in FIG. 8 shows the negative size of the socket/plunger gap as a function of the initial diameter of the two components within the diameter range of interest. Thus, if the respective diameters of the socket and the plunger are both equal to 0.25 inches at the initial room temperature, the diameter of the socket would be 0.0030 inches smaller than that of the plunger after cooling to the temperature of liquid nitrogen, if not for the fact that the metal plunger does not allow a softer polymer socket-seal to shrink this much in the coupled position. The resultant radial force between the two components would lead to an unnecessary high axial force required to retract the plunger from the socket, i.e., to decouple the connection when it is no longer needed. If the initial room temperature diameter of the socket was 0.0030 inches larger than the initial diameter of the plunger, the coupling would leak profusely until both components were completely cooled. Thus, the optimum initial diameter of the socket-seal for the 0.25-inch diameter plunger in this example should be selected from the values ranging from 0.251 to 0.252 inches. The same method should be used to select the optimum range of socket-seal diameters for the plungers with different initial diameters. Also, there is another important advantage of using room-temperature, oversized socket-seal couplings—the wear and tear of the two components during the coupling step is significantly reduced, especially in the case of misalignment of the components.

Alignment problems with the invention are minimized because the OD of the plunger is smaller than the ID of the socket, which increases the likelihood that the plunger will insert properly in the socket without any problem. As a result, the life of the socket, plunger, and socket/plunger coupling are significantly enhanced.

Table 3 below lists different types of single-acting and double-acting linear actuators which can be used with the socket/plunger connection of the invention.

TABLE 3

Types of Small-sized, Linear Actuators Energizing Plunger or Socket-seal, Examples

| Actuator Group | Description | Comments |
| --- | --- | --- |
| Fluid power-pneumatic | compressed gas piston, spring, single-acting with spring return double-acting (reversible) | A moisture-free, compressed gas medium is recommended to eliminate the risk of piston jamming on contact with cold metal parts, a room-temperature nitrogen gas (offstream) from the cryogenic fluid-sourcing tank is preferred. |
| Fluid power-hydraulic | Designs as above, also, piezo-hydraulic types | A portion of the cryogenic fluid stream directed to a spray nozzle can be used as power fluid for the actuator; this design requires a complete thermal insulation of the actuator unit. |
| Electromagnetic | electromagnetic coil/solenoid, linear servo-motors, | The simplest version can be a single-acting coil (plunging into the socket) with a spring return. |
| | magnetostrictive - enhanced operation at cryogenic temperatures | Best fitted for the "through-actuator" cryo-flow configuration shown in FIG. 2; its short stroke requires a correspondingly short distance in the decoupled state between the socket and the plunger tip. |
| Electromechanical - motor driven | drive-screw, nut/screw-plunger, worm-gear | Only faster retracting versions of these actuators are recommended. |

Persons skilled in the art will recognize that the actuating means for this invention may be provided by a turret plate or a carriage that is actuated on its own. In that case, a separate actuator is not required.

In one embodiment, the single-acting units, when energized, push the socket and/or the plunger against each other to establish a coupling. A compression and/or expansion spring is mounted on such a single-action unit to work against the coupling movement and to decouple the socket and plunger as soon as the energizing impulse is removed. This protects the unit from accidental damage in the case of energizing impulse failure. This type of single-acting actuator could be energized from a different energy source than the manufacturing machine on which it is installed. In contrast, the double-acting actuators, or the other types of single-acting actuators, must use the same energy source— electric, pneumatic, or the manufacturing machine—so that any accidental energy failure would prevent the indexing motion of the components of the machine. Alternatively, additional safety interlocks would be required, which could complicate system installation.

Table 4 below gives axial forces (in lbs-force) required to maintain a sealed coupling for a range of internal cryogenic fluid pressures and plunger diameters of interest.

TABLE 4

Axial Force (Compressive) Required to Maintain a Sealed Coupling (lbs-force)

| Plunger Diameter, OD (Inches) | Internal Pressure in Plunger/ Socket-seal Coupling (PSIG) | | |
| --- | --- | --- | --- |
| | 25 | 125 | 275 |
| 0.094 | 0.2 | 0.9 | 1.9 |
| 0.100 | 0.2 | 1.0 | 2.2 |
| 0.125 | 0.3 | 1.5 | 3.4 |
| 0.188 | 0.7 | 3.5 | 7.6 |
| 0.250 | 1.2 | 6.1 | 13.5 |
| 0.375 | 2.8 | 13.8 | 30.4 |
| 0.400 | 3.1 | 15.7 | 34.6 |
| 0.500 | 4.9 | 24.5 | 54.0 |

An actuator mechanism selected for the connection must, at a minimum, exert the same axial force in the energized state to prevent decoupling. In the case of spring-loaded, single-acting actuators, the axial force of the compression and/or expansion spring selected adds to the axial force of the cryo-fluid pressure, which means that the force of the actuator must be correspondingly higher. A spring having a characteristic force should be selected to overcome the friction at the radial socket/plunger connection at the cryogenic temperature, which depends on the initial diameter of the socket with respect to the plunger as well as the type of polymer material that the socket or the socket-seal is made of. In a preferred embodiment, the negative coupling gap or interference fit and the socket or socket-seal material are selected to produce a friction force during the decoupling step that is less than two times the axial pressure force. Consequently, both the spring and the actuator are selected to exert the force of 100% to 200% larger than the pressure force.

FIGS. 9-14 illustrate the main configurations of the LACC system as installed on and connected to manufacturing machines, lathes, milling machines, and other such machines.

FIG. 9 shows a LACC system 20 installed on a horizontal turret lathe 60 used to machine a workpiece 62 using an electrically energized actuator 26. The heavy-duty lathe shown in FIG. 9 uses an indexing, horizontal turret plate 28 with an LACC unit such as that shown in FIG. 1 mounted on a carriage under the turret. Multiple tools 66 (i.e., tool holders or adapters with cutting inserts) are mounted on the horizontal turret plate. Cryogenic fluid, which is used to cool the tools, is delivered from one end of the cryo-fluid outlet line by a spray or jet nozzle. Cryogenic fluid is delivered to the turret-holding carriage by a flexible cryo-fluid delivery line 68. A socket/plunger assembly (such as that in the present invention) is used to connect and disconnect the cryo-fluid delivery line to the cryo-fluid outlet line. As shown in the embodiment in FIG. 1, the socket 24 is mounted on the turret plate 28, and the cryogenic fluid is delivered to the plunger 22 via a T-connection 32. The cryogenic fluid delivery system and the socket/plunger assembly are controlled from the CNC control panel 70, which includes a monitor 72 and keyboard panel 74 with switches. A line 76 from the CNC monitor to a cryo-fluid on/off solenoid valve 78 controls flow of the cryogenic fluid from the delivery line to the plunger via the T-connection. The actuator 26 in this embodiment is in an actuator box mounted on the turret carriage. Another line 80 from the CNC control panel to the turret indexing mechanism provides an electrical signal energizing that mechanism and the actuator, which is used to retract the plunger during indexing. Optionally, the cryogenic fluid flow may be shutoff via the solenoid valve.

Referring still to FIG. 9, there are as many polymer sockets mounted at the bottom of the turret plate 28 as indexing steps and tools 66 mounted on the turret plate and requiring cryo-fluid cooling. A single-acting, electromagnetic coil actuator 26 used in this LACC unit is energized by the same electric impulse as is the carriage, and comprises a mechanism which indexes the turret plate according to a computer program or a command sent from the CNC control panel 70. When the carriage mechanism receives an indexing signal, the plunger is retracted by the energized coil of the actuator. When the carriage and the indexing action stop, the spring 38 of the now de-energized actuator pushes the plunger 22 back into the socket 24 to re-establish connection. This actuating option is safe too, since both the indexing and actuating motions are executed from the same power source and control panel—there is no risk of damaging the plunger if the circuit power fails.

There are several flow-control alternatives for the stream of cryo-fluid during the coupling/decoupling event. The system shown in FIG. 9 provides for two options. The on/off solenoid valve 78 can be "permanently" opened from the control panel 70 for the entire sequence of a manufacturing process regardless of the indexing steps and the coupling/decoupling events. The quantity of cryogenic fluid wasted during decoupling is small, since its average time-length typically is just one or two seconds. Alternatively, the indexing signal from the control panel which energizes the actuator 26 could simultaneously close the solenoid valve by cutting off the original electric current from the panel using a simple electromagnetic switch.

Another mode of operation of the LACC system 20 and an alternate flow control option are shown in FIG. 9A, in which a fluid-power actuator 26 is energized by the cryogenic fluid directed to the turret plate 28 and the tools 66. A by-pass branch 82 from the cryo-fluid line 68 is directed to a piston-type actuator which continuously leaks out a small portion of the fluid. When an indexing signal is sent from the CNC control panel 70 to the carriage and the solenoid valve 78, the solenoid valve shuts down the cryogenic fluid flow, thereby causing a pressure drop in the actuating piston and the desired decoupling. In this case, the spring 38 of the actuator works against the actuating piston, so that the LACC system is safe from accidental damage in the case of failure in the cryogenic fluid supply system.

FIGS. 10-13 show "back-plunging", "radial-plunging", and "front-plunging" configurations of the LACC system installed on a CNC lathe with a vertical turret plate orientation. Although only one socket/plunger connection is shown in each of these figures, the actual number of the connections installed is equal to the number of tools (and corresponding tool-stops or tool positions) that require cryo-fluid cooling.

Figure 10A:
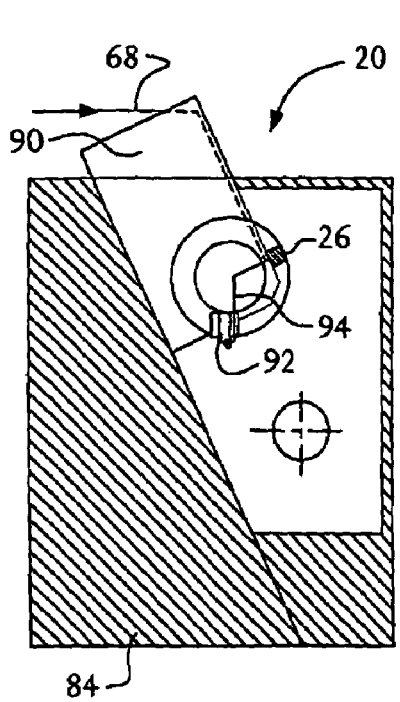
FIGS. 10A and 10B are schematic diagrams of a front view and a side view illustrating a "back-plunger" configuration of an embodiment of the invention installed on a slant-bed lathe with a vertical turret plate having a through-turret plate cryo-fluid passage.
Figure 10B:
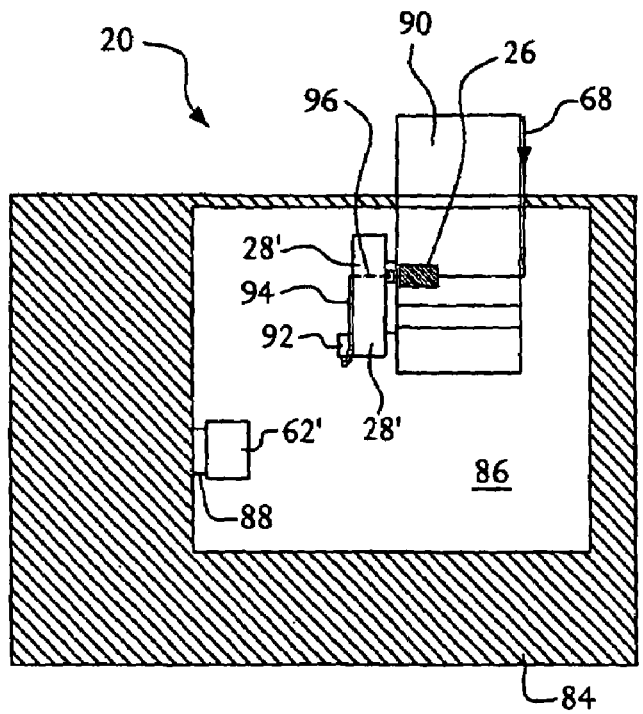

FIGS. 10A and 10B illustrate schematically a "back-plunger" configuration of a LACC system 20 installed on a slant-bed lathe 84 with a vertical turret plate 28'. This is an example of a through-turret plate cryo-fluid passage. FIG. 10B represents a front view of a cabinet of a slant-bed lathe having a vertical turret plate. The work area 86 in the cabinet contains a spindle with a chuck 88 holding a round workpiece 62'. The round turret plate 28' is mounted on the turret carriage 90, and an insulated cryo-fluid inlet line 68 is mounted on the carriage by insulating spacers (not shown). The inlet line is connected to the linear actuator 26. As shown in FIG. 10A, which represents a side view (left side), a toolholder 92 is mounted on the turret plate by an adapter. Cryogenic fluid is transmitted to the toolholder via a cryo-fluid outlet line 94 mounted on the turret plate by insulating spacers (not shown). The connection from the inlet line to the outlet line is provided by the socket/plunger connection of the present invention via an insulated cryo-fluid passage 96 through a channel in the turret plate or via a shank of the tool adapter.

Figure 11A:
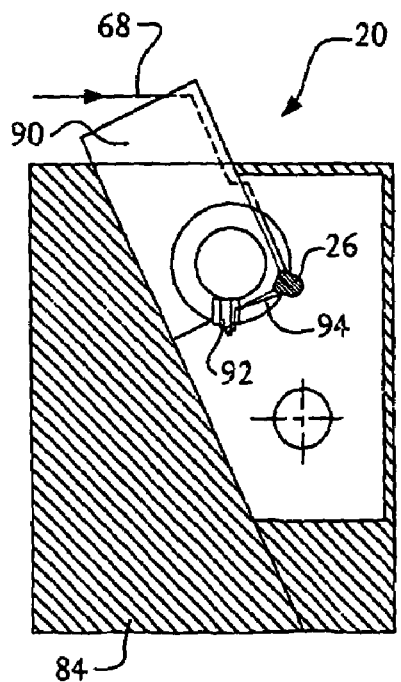
FIGS. 11A and 11B are schematic diagrams of a front view and a side view illustrating a "back-plunger" configuration of an embodiment of the invention installed on a slant-bed lathe with a vertical turret plate having a cryo-fluid passage routed around the circumference of the turret plate.
Figure 11B:
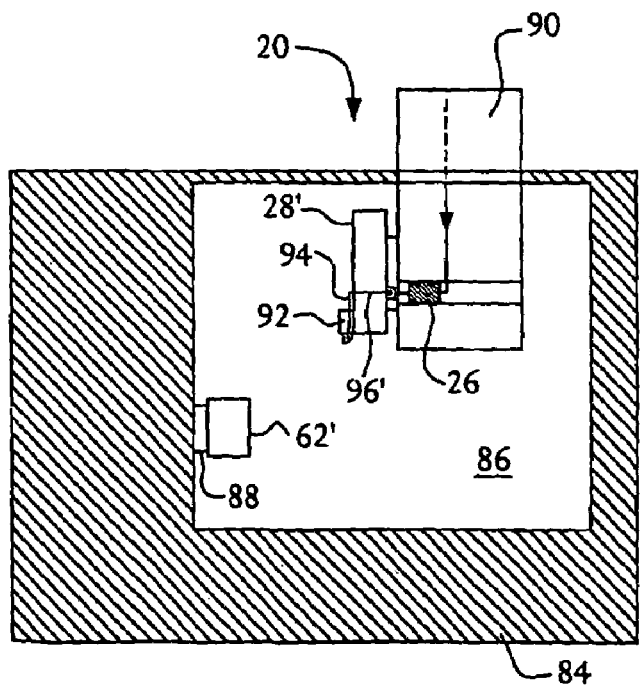

FIGS. 11A and 11B illustrate a modification of the LACC system 20 shown in FIGS. 10A and 10B. In FIGS. 11A and 11B, the cryo-fluid passage 96' is routed around the circumference of the turret plate 28', as shown in the front view (FIG. 11A) and the side view (FIG. 11B).

FIGS. 12A and 12B illustrate a radial-plunger configuration of a LACC system 20 installed on a slant-bed lathe 84 with a vertical turret plate 28'. This is an example where the cryo-fluid outlet line 94 is routed over the surface of the turret plate. Preferably, the insulated cryo-fluid outlet line is routed externally over the turret plate surfaces or internally through existing passages inside the turret plate. FIG. 12B represents a front view of the "radial plunger" configuration, while FIG. 12A represents a side view (left side) of this configuration.

FIGS. 13A and 13B illustrate a "front-plunger" configuration of a LACC system 20 installed on a slant-bed lathe 84 with a vertical turret plate 28'. This is an example where the cryo-fluid line is routed over a front adapter plate 96 and the surface of the turret plate. As shown in FIGS. 13B (front view) and 13A (side view), the round adapter plate holds socket ports, one for each tool cooled by the cryogenic fluid. A holding arm 98 is affixed to the carriage. An insulated cryo-fluid passage through the center of the holding arm transmits cryogenic fluid to the socket-plunger connection.

FIG. 14 shows another application of the LACC system 20 for automatically changed milling cutters on a vertical milling machine 100. This is an example having a socket-plunger coupling in a rotational ring-coupling mounted on an automatically changed milling cutter. The milling machine includes a vertical framework 102 and a spindle box 104 positioned above a table 106. Other components of the machine may include: an optional quill 108; an adapter-holder 110; a rotational coupling 112 comprising a stationary ring and rotating enclosure; a stationary ring 114 with a cryo-fluid inlet; a milling cutter 116 with "through-coolant" channels; and cutting inserts 118 mounted on the milling cutter. A holding arm 120 is affixed to the spindle box (or alternatively to the quill or a slide, depending on specific design of milling machine). Cryogenic fluid is transmitted from the inlet line 68 to an insulated cryo-fluid line passage 122 through the center of the holding arm, and through the linear actuator 26 to the socket-plunger connection of the present invention. When the tool-changing mechanism receives a signal from the CNC control panel 70 (not shown in FIG. 14), the holding-arm mounted actuator pulls back the socket and decouples the adapter ring providing the cryogenic fluid to the cutter.

In all of the embodiments illustrated and discussed above, the LACC design concept makes it possible to minimize the internal surface area of the coupling components in contact with the cryogenic fluid and the overall thermal mass of the connection. The design concept also facilitates the use of thermal insulation between the cryo-cold connection and the manufacturing machine parts which support the connection. This solves four critical problems involving an effective delivery of a cryo-fluid coolant to tools mounted on an indexing and traversing machine component: (1) the time span from the flow signal to the actual flow at the nozzle that cools a desired tool is minimized, (2) the cryo-fluid transfer warm-up and losses are minimized during the steady operation resulting in a stable and fully predictable cooling performance without unexpected pressure and flowrate pulses that would be typical for liquid and/or liquid-gas cryogenic streams contacted with warmer, bulky, and poorly insulated flow components, (3) the supporting machine components remain at room temperature (ambient temperature), do not contract, and retain the dimensional stability desired, and (4) the wear of the polymeric sealing surface is minimized since the tight connection to the metallic plunger develops only on polymer cooling after plunger insertion.

Because of the thermo-mechanical properties of its components, the LACC is cryogenically compatible and can deliver a truly cryogenic and compressed coolant stream from a remote, stationary source to a tool mounted on a traversing and indexing machine component. The typical operating temperature of the LACC components ranges from about −197° C. to about −150° C. while the typical operating pressure ranges from about 50 psig to about 250 psig. Lower as well as higher temperatures (e.g., −10° C.) and lower as well as higher pressures (e.g., 2,500 psig) are within the scope of the present invention, as long as the maximum operation temperature is less than the room temperature from which the process started, and the maximum pressure is less than the yield strength of the socket polymer at the operating temperature.

The invention includes a thermal contraction-based, radial sealing mechanism which allows for venting of the initial, warm portion of cryogenic fluid, and minimizes the wear of the coupling surfaces. Other advantages of this design concept include the rapid flow start-up time, minimized thermal mass of the connection which leads to a stable and predictable coolant performance, a compact size reducing the cryogenic fluid transfer losses and facilitating thermal separation from the supporting machine components that is necessary in order to eliminate undesired dimensional changes in machine components and off-spec workpieces.

The compact, self-contained and fully retrofittable design of the LACC system allows for using a portion of the cryogenic fluid coolant for energizing the actuator which results in a significant simplification of the entire control system.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An apparatus for connecting or disconnecting a supply of a cryogenic fluid to or from a cryogenic cooling means mounted on a member and spaced apart from the supply of the cryogenic fluid, comprising:
   a plunger made at least in part of a first material having a first coefficient of thermal expansion, the plunger having an inlet in fluid communication with the supply of the cryogenic fluid, an outlet in fluid communication with the inlet, and an outer periphery;
   a socket made at least in part of a second material having a second coefficient of thermal expansion, the socket having a first port in fluid communication with the cryogenic cooling means, and a second port in fluid communication with the first port and having an inner periphery adapted to receive the outer periphery of the plunger, the inner periphery and the outer periphery being substantially similar in geometric shape; and
   an actuating means for inserting or withdrawing the outlet of the plunger into or out of the second port of the socket, wherein a difference between the first coefficient of thermal expansion and the second coefficient of thermal expansion enhances a seal between the outer periphery of the plunger and the inner periphery of the second port,
   wherein a leading portion of a stream of the cryogenic fluid is vented from the socket to a surrounding atmosphere before the seal becomes fluid tight.

2. An apparatus for connecting or disconnecting a supply of a cryogenic fluid to or from a cryogenic cooling means mounted on a member and spaced apart from the supply of the cryogenic fluid, comprising:
   a plunger made at least in part of a first material having a first coefficient of thermal expansion, the plunger having an inlet in fluid communication with the supply of the cryogenic fluid, an outlet in fluid communication with the inlet, and an outer periphery;
   a socket made at least in part of a second material having a second coefficient of thermal expansion, the socket having a first port in fluid communication with the cryogenic cooling means, and a second port in fluid communication with the first port and having an inner periphery adapted to receive the outer periphery of the plunger, the inner periphery and the outer periphery being substantially similar in geometric shape; and
   an actuating means for inserting or withdrawing the outlet of the plunger into or out of the second port of the socket, wherein a difference between the first coefficient of thermal expansion and the second coefficient of thermal expansion enhances a seal between the outer periphery of the plunger and the inner periphery of the second port,
   wherein the actuating means is energized at least in part by a portion of the cryogenic fluid.

3. An apparatus as in claim 2, wherein the seal is further enhanced when a stream of the cryogenic fluid flows through the outlet.

4. An apparatus as in claim 2, wherein the first material is metallic.

5. An apparatus as in claim 2, wherein the second material is polymeric.

6. An apparatus as in claim 2, wherein the first coefficient of thermal expansion is less than the second coefficient of thermal expansion.

7. An apparatus as in claim 2, wherein the member is movable.

8. An apparatus as in claim 7, wherein the movable member is a machine component.

9. An apparatus as in claim 2, wherein the actuating means is automated and adapted to automatically insert or withdraw the outlet of the plunger into or out of the second port of the socket.

10. An apparatus for connecting a supply of a cryogenic fluid to a cryogenic cooling means mounted on a movable machine component and spaced apart from the supply of the cryogenic fluid, comprising:

a plunger made at least in part of a metal having a first coefficient of thermal expansion, the plunger having an inlet in fluid communication with the supply of the cryogenic fluid, an outlet in fluid communication with the inlet, and an outer periphery;

a socket made at least in part of a polymer having a second coefficient of thermal expansion greater than the first coefficient of thermal expansion, the socket having a first port in fluid communication with the cryogenic cooling means, and a second port in fluid communication with the first port and having an inner periphery adapted to receive the outer periphery of the plunger, the inner periphery and the outer periphery being substantially similar in geometric shape; and an automated actuating means for inserting automatically the outlet of the plunger into the second port of the socket, wherein a difference between the first coefficient of thermal expansion and the second coefficient of thermal expansion enhances a seal between the outer periphery of the plunger and the inner periphery of the second port, and wherein a leading portion of a stream of the cryogenic fluid flowing from the plunger is vented from the socket to a surrounding atmosphere before the seal becomes fluid tight.

11. An apparatus as in claim 10, wherein the seal is further enhanced when a stream of the cryogenic fluid flows through the outlet.

12. An apparatus as in claim 10, wherein the automated actuating means automatically moves the plunger toward the socket.

13. An apparatus as in claim 10, wherein the automated actuating means automatically moves the socket toward the plunger.

14. An apparatus as in claim 10, wherein the movable machine component is a turret.

15. An apparatus as in claim 10, wherein the automated actuating means is activated by a computerized numerical controller.

16. A machine including at least one apparatus as in claim 10.

17. A method for connecting a supply of a cryogenic fluid to a cryogenic cooling means mounted on a member and spaced apart from the supply of the cryogenic fluid, comprising the steps of:

providing a plunger made at least in part of a first material having a first coefficient of thermal expansion, the plunger having an inlet in fluid communication with the supply of the cryogenic fluid, an outlet in fluid communication with the inlet, and an outer periphery;

providing a socket made at least in part of a second material having a second coefficient of thermal expansion, the socket having a first port in fluid communication with said cooling means, and a second port in fluid communication with the first port and having an inner periphery adapted to receive the outer periphery of the plunger, the inner periphery and the outer periphery being substantially similar in geometric shape;

providing an actuating means for inserting the outlet of the plunger into the second port of the socket, wherein a difference between the first coefficient of thermal expansion and the second coefficient of thermal expansion enhances a seal between the outer periphery of the plunger and the inner periphery of the second port;

energizing the actuating means, thereby inserting the outlet of the plunger into the second port of the socket; and venting a portion of the cryogenic fluid from the socket to a surrounding atmosphere before the seal becomes fluid tight.

18. A method as in claim 17, comprising the further step of flowing a stream of the cryogenic fluid into the inlet and through the outlet of the plunger, thereby further enhancing the seal.

19. A method for connecting a supply of a cryogenic fluid to a cryogenic cooling means mounted on a movable machine component and spaced apart from the supply of the cryogenic fluid, comprising the steps of:

providing a plunger made at least in part of a metal having a first coefficient of thermal expansion, the plunger having an inlet in fluid communication with the supply of the cryogenic fluid, an outlet in fluid communication with the inlet, and an outer periphery;

providing a socket made at least in part of a polymer having a second coefficient of thermal expansion greater than the first coefficient of thermal expansion, the socket having a first port in fluid communication with the cryogenic cooling means, and a second port in fluid communication with the first port and having an inner periphery adapted to receive the outer periphery of the plunger, the inner periphery and the outer periphery being substantially similar in geometric shape;

providing an automated actuating means for inserting automatically the outlet of the plunger into the second port of the socket, wherein a difference between the first coefficient of thermal expansion and the second coefficient of thermal expansion enhances a seal between the outer periphery of the plunger and the inner periphery of the second port;

energizing the actuating means, thereby inserting the outlet of the plunger into the second port of the socket, wherein a leading portion of a stream of the cryogenic fluid flowing from the plunger is vented from the socket to a surrounding atmosphere before the seal becomes fluid tight; and flowing a stream of the cryogenic fluid into the inlet and through the outlet of the plunger, thereby further enhancing the seal.

20. A method as in claim 19, wherein the automated actuating means is activated by a computerized numerical controller.

* * * * *